UNITED STATES PATENT OFFICE.

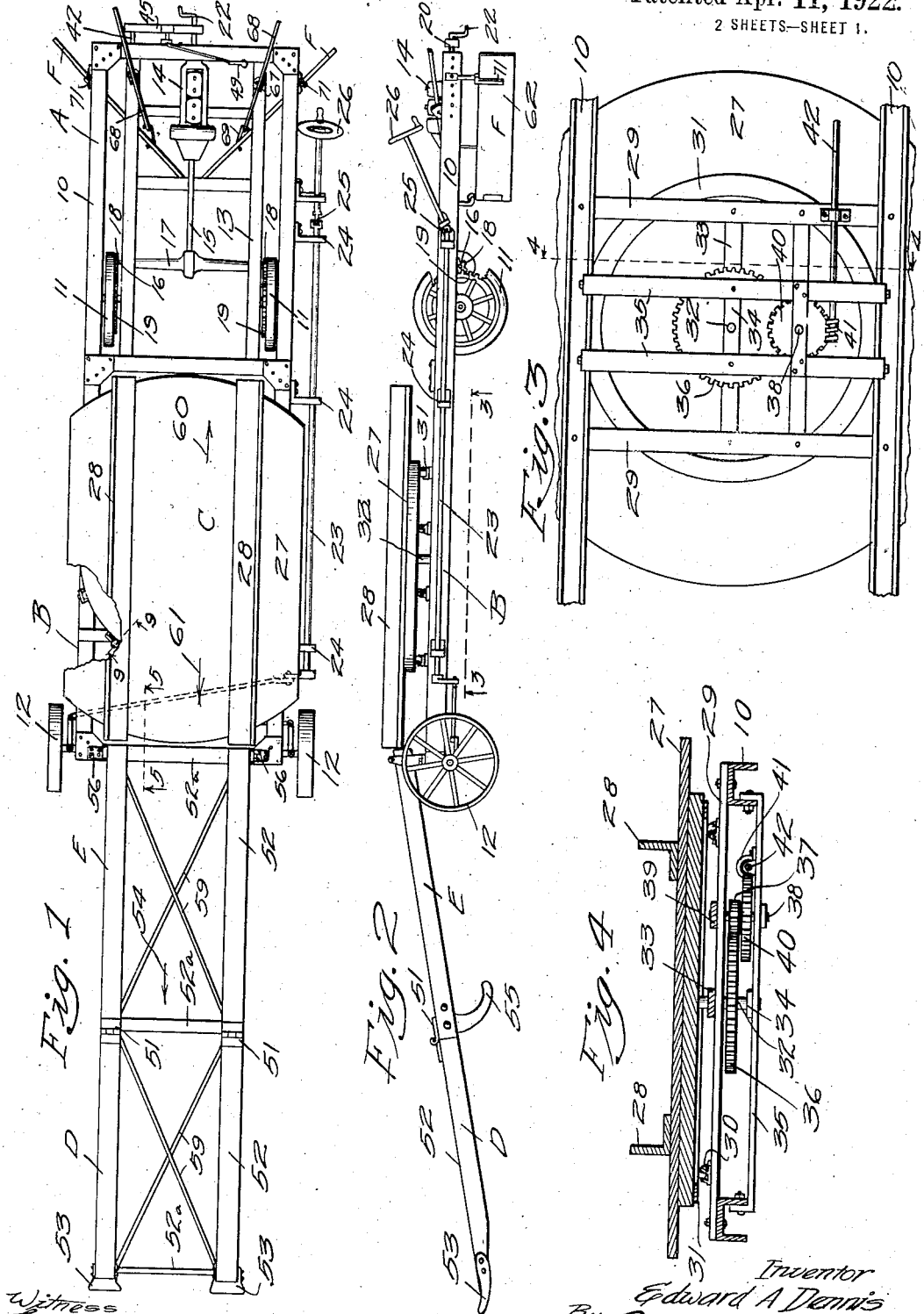

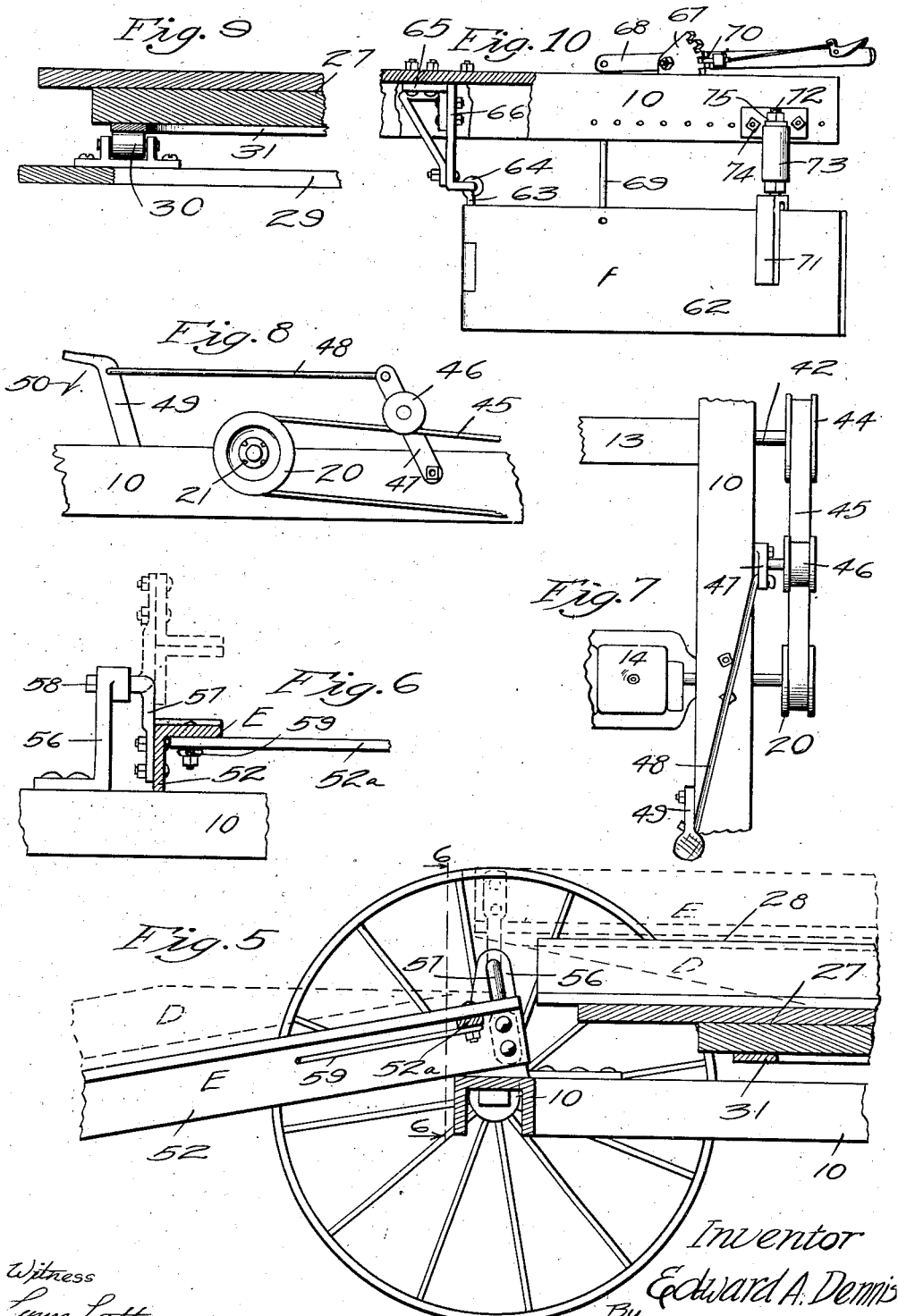

EDWARD A. DENNIS, OF SPENCER, IOWA.

TRUCK TURNTABLE AND GRAVEL SPREADER.

1,412,389.  Specification of Letters Patent.  Patented Apr. 11, 1922.

Application filed June 11, 1921. Serial No. 476,836.

*To all whom it may concern:*

Be it known that I, EDWARD A. DENNIS, a citizen of the United States, and a resident of Spencer, in the county of Clay and State of Iowa, have invented a certain new and useful Truck Turntable and Gravel Spreader, of which the following is a specification.

The object of my invention is to provide a device especially adapted for road making, whereby a truck or vehicle of gravel may be turned around, permitted to dump its contents, and the contents, which are ordinarily gravel, spread out over the road, the machine being of comparatively inexpensive construction, substantial and easily operated.

More particularly, my invention relates to a machine mounted on wheels, capable of turning a vehicle substantially 180° for permitting the contents of the vehicle to be dumped onto the road just rearwardly of the turn table device, and a spreader device arranged on said machine just rearwardly of the dumped material, which will cause the dumped material to be spread out over the road with the forward advance of the entire machine.

Still another object is to provide a runway for a device of the class just mentioned, which runway may be folded and swung to position, where it will rest upon the machine, when the machine is moved from place to place.

Still another object is to provide a spreader device arranged to spread the material over the road, the spreader being capable of adjustment for working roads of various widths and also capable of being arranged for giving a "crown" effect to the road.

Still another object is to provide shoe or runner members on the forward ends of the runway, so that the entire machine may be moved forwardly a short distance at a time, without raising the runway.

The dumping of the gravel on the road either necessitates the next truck delivering gravel to pass the piles of gravel just dumped, or else to turn around and go back over the same road over which it came.

It may be mentioned that ordinary country roads are usually of insufficient width to permit the easy turning around of a large truck. The turning around of the truck on the narrow road, causes the edge to be unnecessarily broken up, which is a result not desired. The turning of the vehicle around on the road unnecessarily delays the next oncoming truck with gravel.

My machine is designed to easily rotate the truck 180°, so that after the material is dumped therefrom, it is headed in the direction from which it came. This means that it is not necessary for the truck to pass over the piles of gravel or to turn around under its own power in a narrow road.

My machine also eliminates the unnecessary delay of the oncoming trucks by making it possible to easily and quickly turn the truck under power independent of the truck.

My machine is designed to spread the gravel or other contents dumped on the road, as the entire machine is moved forwardly over the road to be graveled or worked.

It will therefore be seen that it is essential that the portion of the machine rearwardly of the turn table device and forwardly of the spreading blades be left open, so that the contents of the truck may be dumped onto the road and spread, as the entire machine is moved forwardly from time to time.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 is a top plan view of my device.

Figure 2 is a side elevation of the same.

Figure 3 is a view taken on the line 3—3 of Figure 2, showing the under side of the turn table device and the arrangement of the gearing for rotating the same.

Figure 4 is a sectional view taken on the line 4—4 of Figure 3, showing the gearing arrangement.

Figure 5 is a sectional view taken on the line 5—5 of Figure 1, showing the various positions of the runway when folded by dotted lines.

Figure 6 is a sectional view taken on the line 6—6 of Figure 5.

Figure 7 is an enlarged plan view of a portion of the rear end of the machine, showing a portion of the drive mechanism for rotating the turn table device.

Figure 8 is a side elevation of the same.

Figure 9 is a detailed, sectional view taken on the line 9—9 of Figure 1, showing the rollers supporting the turn table device; and Figure 10 is a detailed, side elevation of the spreader device.

In the accompanying drawings, I have used the reference numeral 10 to indicate generally a rectangular frame, which is supported by drive wheels 11 and steerable wheels 12.

The frame 10 is divided into two sections A and B.

The section B is provided with an auxiliary frame 13, upon which is mounted an engine 14, having a drive shaft 15 thereon operatively connected to a rear axle 16 mounted in the axle housing 17. The ends of the rear axle 16 are provided with gears 18, which are in mesh with large gears 19, which are fixed to the drive wheels 11.

From the construction of the parts just described, it will be seen that the engine 14 supplies power for moving the entire machine forwardly.

It will be noted that the engine 14 is mounted rearwardly of the drive wheels 11, the purpose of which will be hereafter more fully set forth.

The engine 14 is of the ordinary construction and the ordinary clutch mechanism and clutch pedals are used for manipulating the engine. The crank shaft of the engine 14 has fixed to its forward end a drive pulley wheel 20, the purpose of which will be hereafter more fully set forth.

The drive pulley wheel 20 is provided with a hub having notches 21 therein, whereby a crank 22 may be used for starting the engine.

The steerable wheels 12 are connected to a steering shaft 23, which is supported on the frame 10 by means of bearing members 24. The steering shaft 23 is provided with a universal joint 25 and a steering wheel 26.

A turn table device C is rotatably mounted on the portion B of the frame 10.

The construction and arrangement of the turn table device will now be fully described.

The turn table device C consists of a floor member 27, which has a pair of angle irons or the like 28 secured thereto, which will form a guide for the vehicle to be placed upon the turn table device. A pair of cross bars 29 are extended between the sides of the frame 10 for supporting roller members 30. A metallic ring 31 is secured to the floor member 27 on its under side, which metallic ring is supported on the rollers 30 for permitting the entire turn table device to easily rotate.

The frame 10 is also provided with roller members 30 which support the entire turn table device C. The turn table device is provided with a main vertical shaft 32, which is journaled in a pair of cross bars 33 and 34.

The cross bar 33 is fixed to the cross bars 29 as clearly shown in Figures 3 and 4 of the drawings.

Secured to the frame member 10 are a second pair of cross pieces 35. The cross bar 34 is secured to the cross pieces 35. A large gear 36 is mounted on the shaft 32, which gear is in mesh with a small gear 37 on the shaft 38. The shaft 38 is mounted in a pair of short cross pieces 39.

A worm wheel 40 is secured to the shaft 38, and is in mesh with a worm 41. The worm 41 is secured to the shaft 42. Bearing members 43 are secured to one of the cross pieces 35 and one of the cross bars 29 for supporting the shaft 42. The shaft 42 extends rearwardly and directly below one of the sides of the frame member 11 and projects rearwardly beyond the rear edge of the frame 10.

A pulley wheel 44 is secured to the shaft 42, which pulley wheel is substantially in line with the pulley wheel 20 on the crank shaft of the automobile.

A belt 45 is used for connecting the pulley wheel 20 with the pulley wheel 44.

It will be understood that it is desirable only to rotate the turn table at intervals, and in order to cause the shaft 42 to rotate at intervals, I provide a clutch mechanism of the following description.

An idler pulley wheel 45 is secured to a link 47 pivoted on the frame 10. A rod 48 is connected to the upper end of the link 47 and has its free end pivotally connected to a foot lever 49.

From the construction of the parts just described, it will be seen that moving the foot lever in the direction indicated by the arrow 50 will cause the belt 45 to tightly engage the pulley wheels 20 and 44, thus causing the shaft 42 to be rotated, which in turn will rotate the entire turn table C.

In order to permit trucks or vehicles to pass onto the turn table device C, I provide runways, which are composed of two sections D and E. The sections D and E are hinged together by means of the hinges 51 at their adjacent ends. Each of the sections of the runways D and E are composed of two track members 52. The members 52 of the section E are connected together by cross pieces 52ª.

The free end of the section D of the runway, which rests upon the ground is provided with shoes or runners 53, so that when the entire machine is moved forwardly or in the direction indicated by the arrow 54, it will pass over the road.

Fixed to the forward end of the section E of the runway and directly below the hinges 51, are the shoes 55, which support the center portion of the runway.

Mounted on the forward end of the main frame 10 are a pair of bearing members 56. The bearing members 56 are arranged, so that they project upwardly beyond the upper edge of the upper end of the section E of the runway, the purpose of which will be hereinafter more fully set forth.

Secured to the sides of the upper end of the section E of the runway are the arms 57, which have spindles 58 formed at upper ends and bent substantially at right angles to the main portion of the arms 57.

The spindles 58 are received in the bearing members 56. Reinforcing cross rods 59 are designed to secure each of the members 52 together for holding them in proper spaced relationship to each other.

It will be understood that when it is desired to move the entire machine from place to place, the runway may be folded by first folding the section D and causing it to rest upon the section E, as shown in dotted lines in Figure 5 of the drawings.

Both sections D and E may then be swung over the spindles 58, serving as a pivot, until both sections rest upon the turn table C. The angle irons 28, which serve as guide members are so arranged that the runways will be received therebetween.

The arrangement of the bearing member 56, so that it projects above the upper end of the runway E, permits the folding and swinging of the runway to the position shown in dotted lines in Figure 5 of the drawings.

When the trucks pass up the runways and onto the turn table, they are traveling in the direction indicated by the arrow 60. Blocks may be placed just ahead of the front wheels of the truck for preventing them from passing beyond the turn table device.

The turn table is then rotated through an angle of 180° in which position the truck is then headed in the direction of the arrow 61. Blocks are then placed behind the rear wheels of the truck.

The body of the truck is then raised and the contents dumped between the drive wheels 11 and the auxiliary frame 13. This portion of the entire machine is left open, so that the gravel from the trucks may be dumped onto the road.

The trucks having been rotated are then free to pass down the runway without the necessity of having them turn around in the road under their own motive power.

It will be understood that after each truck load has been dumped, it is highly desirable to advance my entire machine forwardly a slight distance, so that the gravel may be equally spread over the road. In order to spread the gravel over the road, I provide a spreader device F, which consists of a pair of spreader blades 62, which are hinged together at their forward and inner ends. The blades 62 are normally inclined rearwardly and outwardly, as clearly shown in Figure 1 of the drawings.

A rod 63 serves as the pintle for connecting the inner ends of the blade members 62, together, which rod has its upper end formed with an eye 64. A cross bar 65 is fixed to the auxiliary frame 13 directly above the rear forward ends of the blades 62.

A reinforcing support 66 extends downwardly from the cross bar 65 and is secured to the eye 64, so as to permit a slight pivotal movement of the parts.

It will be understood that it is highly desirable to raise and lower the outer ends of the blades or spreader 62, for forming a "crown" effect to the road.

In order to raise and lower the blades 62, I provide notched sectors 67, which are fixed to the auxiliary frame 13 and have the levers 68 pivoted thereto. The levers 68 have their forward ends pivotally connected to links 69. The links 69 have their free ends secured to the blades 62.

A spring actuated pawl member 70 is provided on the levers 68, whereby the blades 62 may be raised or lowered and locked in position.

In order to hold the outer ends of the blades 62 against any inward movement, I provide a yoke device 71, which has the blades 62 received therebetween. Each of the yoke devices 71 are provided with a spindle 72 which is rotatably mounted in a bearing member 37 fixed to the frame 10 by means of the bolts 74. The upper end of the spindle members 72 are provided with nuts 75 for holding them in position.

From the construction of the parts just described, it will be seen that up and down movement of the outer ends of the blades 62 will not interfere with the yoke members 71 from holding the blades in proper position.

When it is desired to vary the angle of inclination of the blades 62 for working roads of various widths, the bearing members 73 may be moved forwardly by loosening the bolts 74 and extending them through openings 76, which are provided in the frame 10.

From the construction of the parts just described, it will be seen that when the bearing member 73 is moved forwardly, it will cause the outer ends of the blades 62 to be moved outwardly, thus causing them to engage a wider surface of the road.

From the construction of the parts just described, it will also be seen that after a truck load of gravel has been dumped, the moving of the machine forwardly a slight distance will cause the spreader device F to engage the pile of gravel and spread it out uniformly over the road.

It will be seen that I have provided a very efficient device for road making, more particularly the graveling of roads.

It will be seen that the unnecessary delay ordinarily caused by the turning of trucks within a narrow road or having them pass over the pile of gravel previously dumped is an inconvenience avoided by the use of my machine. My machine also spreads the gravel over the road uniformly.

Some changes may be made in the arrangement and construction of the various parts of my device, without departing from the real spirit and purpose of my invention, and it is my intention to cover by my claims, any modified forms of structure or use of mechanical equivalents, which may be reasonably included within their scope.

I claim as my invention:

1. In a device of the class described, a frame supported on wheels, a pair of said wheels being steerable, an engine mounted on the rear end of said frame, means for operatively connecting the engine to the drive wheels of the frame, a foldable hinged runway secured at one end to the frame and adapted to have its free end rest upon the ground, a turn table device rotatably mounted on said frame on the opposite side of said engine, guides on said turn table adapted to register with said runway for permitting vehicles to pass up said runway and onto said turn table device, means for operatively connecting said turn table device to said engine for rotating said turn table, the portion of said frame just rearwardly of said turn table device and forwardly of said engine being open, whereby a vehicle containing gravel may be turned around on said turn table device and dumped onto the road through said open portion of the frame and a scraper device mounted on said frame for the spreading of the dumped gravel, all for the purposes stated.

2. In a device of the class described, a frame supported on wheels, a pair of said wheels being steerable, an engine mounted on the rear end of said frame, means for operatively connecting the engine to the drive wheels of the frame, a foldable hinged runway secured at one end to the frame and adapted to have its free end rest upon the ground, a turn table device rotatably mounted on said frame on the opposite side of said engine, guides on said turn table adapted to register with said runway for permitting vehicles to pass up said runway and onto said turn table device, means for operatively connecting said turn table device to said engine for rotating said turn table, the portion of said frame just rearwardly of said turn table device and forwardly of said engine being open, whereby a vehicle containing gravel may be turned around on said turn table device and dumped onto the road through said open portion of the frame, and a scraper device capable of having its outer ends lowered for spreading the gravel, so as to form a crown road.

3. In a device of the class described, a frame supported on wheels, a pair of said wheels being steerable, an engine mounted on the rear end of said frame, means for operatively connecting the engine to the drive wheels of the frame, a foldable hinged runway secured at one end to the frame and adapted to have its free end rest upon the ground, a turn table device rotatably mounted on said frame on the opposite side of said engine, guides on said turn table adapted to register with said runway for permitting vehicles to pass up said runway and onto said turn table device, means for operatively connecting said turn table device to said engine for rotating said turn table, the portion of said frame just rearwardly of said turn table device and forwardly of said engine being open, whereby a vehicle containing gravel may be turned around on said turn table device and dumped onto the road through said open portion of the frame, and a scraper device comprising a pair of blades hinged together at their forward ends and capable of having their outer ends moved forwardly or rearwardly as desired, for the purposes stated.

4. In a device of the class described, a turn table device for turning a vehicle containing gravel substantially 180° for permitting it to be dumped rearwardly of the turn table device, and a scraper device mounted for spreading the dumped gravel over the road, for the purposes stated.

5. In a device of the class described, a turn table device for turning a vehicle containing gravel substantially 180° for permitting it to be dumped rearwardly of the turn table device, and a scraper device mounted for spreading the dumped gravel over the road and capable of being adjusted for roads of various widths and also for giving a crown effect to a road.

6. In a device of the class described, a frame, an engine on said frame, a turn table device on said frame and operatively connected to said engine, a runway leading to one end of said turn table for permitting vehicles to pass onto the turn table for dumping their contents of gravel or the like rearwardly of said turn table device and forwardly of the engine and a scraper device for spreading of the gravel or the like over the road.

7. In a device of the class described, a frame, an engine on said frame, a turn table device on said frame and operatively connected to said engine, a runway leading to one end of said turn table for permittng vehicles to pass onto the turn table for dumping their contents of gravel or the like rearwardly of said turn table device and forwardly of the engine, said runway being capable of being folded and swung over said turn-table when in inoperative position, and a scraper device for spreading of the gravel or the like over the road.

8. In a device of the class described, a turn table device for turning a vehicle containing gravel substantially 180° for permitting it to be dumped rearwardly of the turn table device, a runway arranged to permit a vehicle to pass up onto said turn table, shoe members secured to the free ends of said runway for permitting it to pass over the ground when the device is moved forwardly, and a scraper device for spreading the dumped gravel over the road for the purposes stated.

Des Moines, Iowa, June 6, 1921.

EDWARD A. DENNIS.